(12) United States Patent
Gatland

(10) Patent No.: US 10,802,125 B2
(45) Date of Patent: Oct. 13, 2020

(54) TOUCH-GESTURE CONTROL FOR SIDE-LOOKING SONAR SYSTEMS

(71) Applicant: FLIR Belgium BVBA, Meer (BE)

(72) Inventor: Christopher Daniel Gatland, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 228 days.

(21) Appl. No.: 15/716,399

(22) Filed: Sep. 26, 2017

(65) Prior Publication Data

US 2018/0095170 A1 Apr. 5, 2018

Related U.S. Application Data

(60) Provisional application No. 62/403,613, filed on Oct. 3, 2016.

(51) Int. Cl.
*G01S 7/62* (2006.01)
*G06F 3/041* (2006.01)
(Continued)

(52) U.S. Cl.
CPC ............ *G01S 7/629* (2013.01); *G01S 7/6272* (2013.01); *G01S 7/6281* (2013.01); *G01S 15/86* (2020.01);
(Continued)

(58) Field of Classification Search
CPC ...... G01S 7/629; G01S 7/6281; G01S 7/6272; G01S 15/025; G01S 15/8902; G01S 15/96; G01S 15/89; G01S 15/86; G01S 15/87; G01S 7/6218; G01S 13/937; G01S 7/24; G01S 15/66; G01S 7/58; G01S 7/6236; G06F 3/04845; G06F 3/04883; G06F 3/0416; G06F 2203/04806; G06F 3/017; G06F 3/04842; G06F 3/0488; G06F 2203/04803; G06F 16/29; G06F 3/0486; G06F 3/0304; G06F 3/0485; G01C 21/00; G01C 21/20; G01C 13/00;
(Continued)

(56) References Cited

U.S. PATENT DOCUMENTS 8,687,023 B2 * 4/2014 Markiewicz .......... G06F 3/0485
345/684
8,928,615 B2 * 1/2015 Meng .................... G06F 3/0488
178/18.01
(Continued)

*Primary Examiner* — Duc Q Dinh
(74) *Attorney, Agent, or Firm* — Haynes and Boone, LLP

(57) ABSTRACT

Techniques are disclosed for systems and methods to provide touch screen side-scan sonar adjustment for mobile structures. A side-scan sonar adjustment system includes a user interface with a touch screen display and a logic device configured to communicate with the user interface and a side-scan sonar system. The user interface is configured to receive and/or display side-scan sonar data provided by the side-scan sonar system. The logic, device is configured to determine a horizontal swipe gesture rate component performed on the touch screen display, stretch the displayed image in accordance with the swipe gesture, and snap to a new field of view in accordance with current field of view and swipe length information. The user interface and logic device may be integrated together to form a multifunction display used to power and/or supply side-scan sonar transmission signals to the side-scan sonar system.

20 Claims, 8 Drawing Sheets

(Left View)

(Right View)

(51) Int. Cl.
*G06F 3/0488* (2013.01)
*G01S 15/89* (2006.01)
*G06F 3/0484* (2013.01)
*G01S 15/86* (2020.01)
*G01S 15/96* (2006.01)

(52) U.S. Cl.
CPC ........ *G01S 15/8902* (2013.01); *G06F 3/0416* (2013.01); *G06F 3/04845* (2013.01); *G06F 3/04883* (2013.01); *G01S 15/96* (2013.01); *G06F 2203/04806* (2013.01)

(58) Field of Classification Search
CPC ........... G08G 1/096725; G08G 1/0112; G08G 1/0129; G08G 1/00; G08G 1/143; G08G 5/045; G02B 2027/014; G02B 27/017; G02B 2027/0138; G02B 2027/0178; G02B 27/0172; G02B 2027/0187; G02B 27/0093; G02B 6/0096; G02B 2027/0141; G02B 27/0176; G02B 27/0179; G02B 2027/0156; G02B 2027/0127; G02B 2027/0147; G02B 2027/0161; G02B 30/34
USPC .................................................. 345/173–175
See application file for complete search history.

(56) References Cited

U.S. PATENT DOCUMENTS

| | | | |
|---|---|---|---|
| 9,002,058 B2 | 4/2015 | Viswanathan et al. | |
| 2014/0152599 A1* | 6/2014 | Lee .......................... | G06F 3/017 345/173 |
| 2016/0018516 A1* | 1/2016 | Brown .................. | B06B 1/0622 367/11 |
| 2016/0054914 A1 | 2/2016 | Di Censo et al. | |

* cited by examiner (Left View)

(Right View)

(Center View)

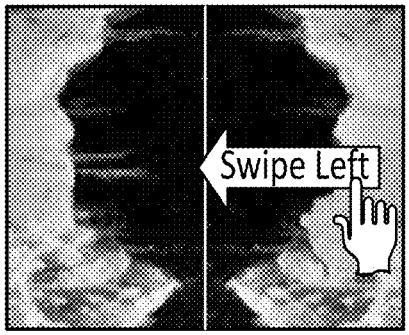
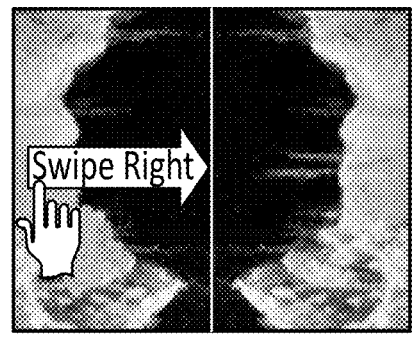
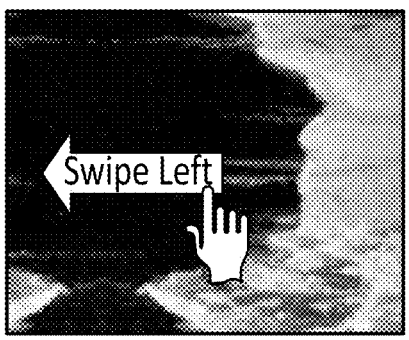
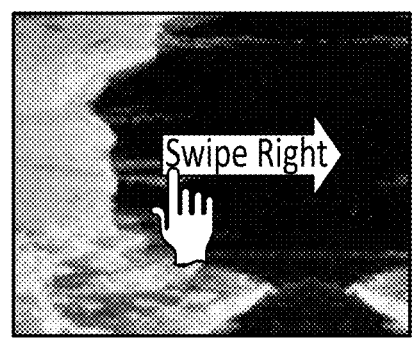
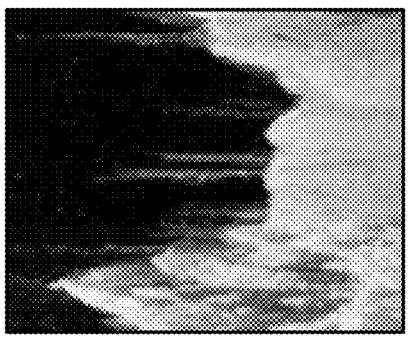
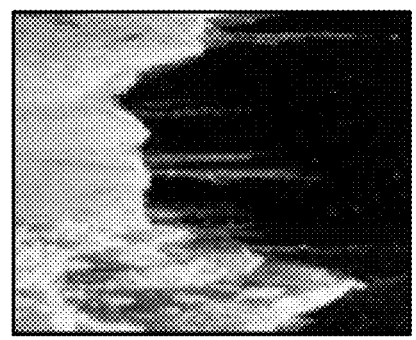
FIG. 5A
(Swipe Left)
FIG. 5B
(Swipe Right)

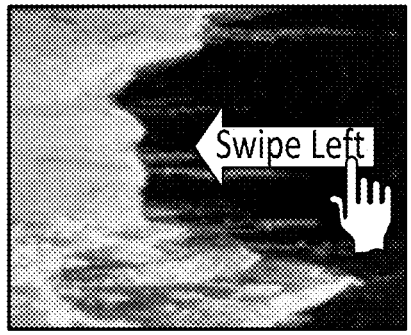
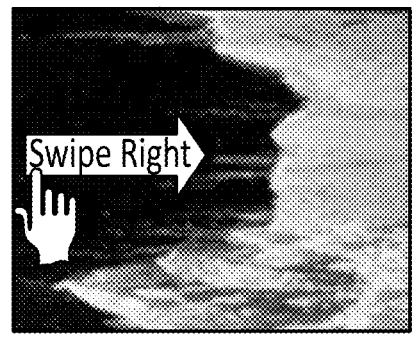
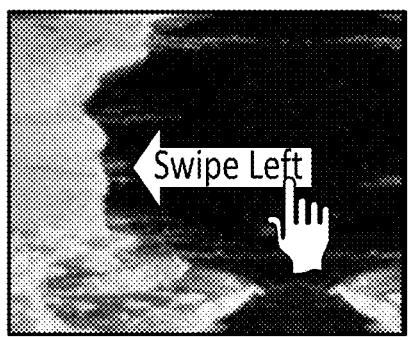
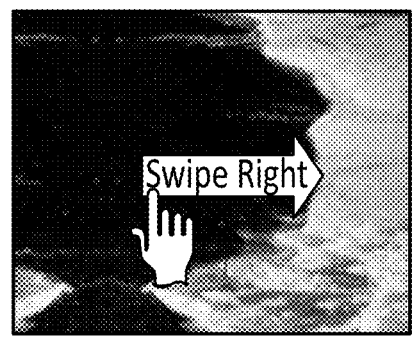
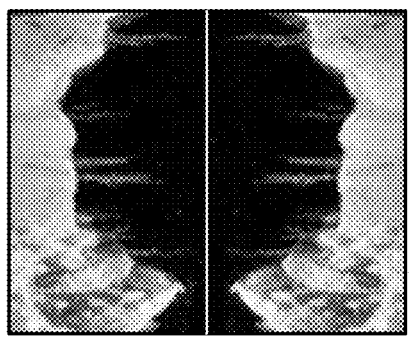
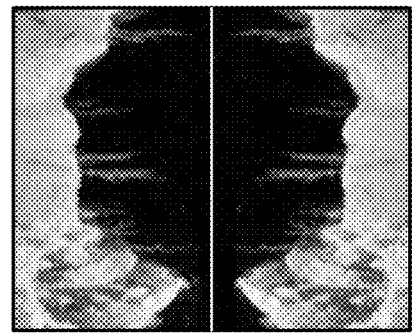
FIG. 5C
(Swipe Left to Center)
FIG. 5D
(Swipe Right to Center)

TOUCH-GESTURE CONTROL FOR SIDE-LOOKING SONAR SYSTEMS

CROSS-REFERENCE TO RELATED APPLICATIONS

This application claims the benefit of and priority to U.S. Provisional Patent Application No. 62/403,613 filed Oct. 3, 2016 and entitled "Touch-Gesture Control for Side-Looking Sonar Systems," which is incorporated herein by reference in its entirety.

TECHNICAL FIELD

One or more embodiments of the invention relate generally to sonar systems and more particularly, for example, to systems and methods for controlling side-looking sonar systems and/or imagery.

BACKGROUND

Sonar may be used to perform bathymetry, detect underwater hazards, find fish, and/or otherwise assist in navigation by producing data and/or imagery of a water column and/or a floor of a body of water beneath a watercraft. Conventional sonar systems often include a display configured to provide traditionally recognizable sonar imagery based on the sonar data to a user.

Conventional sonar systems typically require a user to perform a number of difficult and/or non-intuitive steps to adjust operating and/or display parameters for the sonar systems. A user can easily miss interesting and sometimes critical features in related sonar imagery, which may include down-looking images, side-looking images, forward looking images, and views incorporating combinations of each. At the same time, consumer market pressures and convenience dictate easier to use systems that include a variety of user-defined features and that produce high quality resulting imagery. Thus, there is a continued need for an improved methodology to provide feature-rich sonar systems, particularly in the context of providing intuitive user interface and control of aspects of side-looking sonar systems and/or resulting side-looking sonar imagery to the general operation of a watercraft.

SUMMARY

Techniques are disclosed for systems and methods to provide touch screen sonar control and adjustment for mobile structures. A sonar system may include user interfaces with touch screen displays and logic devices configured to communicate with the user interfaces and one or more sonar systems. Each user interface may be configured to receive and/or display sonar data provided by the sonar systems. The logic devices may be configured to adjust a view based on swipe gestures performed on the touch screen displays. In some embodiments, user interfaces and logic devices may be integrated together to form multifunction displays used to power and/or supply sonar transmission signals to sonar systems. In other embodiments, user interfaces and logic devices may be integrated together to form portable user interfaces configured to communication with the sonar systems wirelessly.

In various embodiments, a sonar system may include one or more orientation sensors, position sensors, gyroscopes, accelerometers, and/or additional sensors, actuators, controllers, user interfaces, mapping systems, and/or other modules mounted to or in proximity to a vehicle. In further embodiments, the sonar system may be generalized to a remote sensing system and be used to operate, configure and adjust operation of a remote sensing system, such as radar, sonar, LIDAR, and/or other remote sensing systems (e.g., stimulus/response sensing systems), through use of a touch screen display, as described herein. Each component of the system may be implemented with a logic device adapted to form one or more wired and/or wireless communication links for transmitting and/or receiving sensor signals, control signals, or other signals and/or data between the various components.

In one embodiment, a system may include a user interface comprising a touch screen display configured to receive and/or display sonar data provided by a sonar system, and a logic device configured to communicate with the user interface and/or the sonar system. The logic device may be configured to change a current display view based on a swipe gesture performed on the touch screen display, adjust the display based, at least in part, on the swipe gesture, and render the sonar data according to the current display view.

In another embodiment, a method may include detecting a swipe gesture performed on a touch screen display of a user interface, wherein the user interface is configured to receive and/or display sonar data provided by a sonar system and render the sonar data according to the swipe gesture.

In another embodiment a system may include a user interface having a touch screen display configured to receive and/or display side-looking sonar data provided by a side-looking sonar system (also referred to herein as a "sidescan" sonar system), and a logic device configured to communicate with the user interface and/or the side-looking sonar system. The logic device may be configured to detect a horizontal swipe gesture performed on the touch screen display, adjust the touch screen display based on the swipe contact to stretch the field of view in the direction of the swipe, and snap the touch screen display to a view based, in part, on the length of the horizontal swipe.

In one embodiment, detecting a horizontal swipe gesture may include detecting a starting point of contact on the touch screen display, such as a finger or stylus in contact with the touch screen display, tracking the point of contact across the touch screen display, and estimating a direction of travel and a distance of travel between a starting contact point and a second contact point, which may be an ending contact point or an intermediary contact point. To detect a horizontal swipe, the direction of travel may be compared to one or more parameters such as a range of swipe directions, and the distance of travel may be compared to a swipe distance threshold.

The logic device may be further configured to stretch the displayed image left or right in response to a detected horizontal swipe, with the image tracking the contact position during the horizontal swipe gesture, and set a field of view of the sonar data to be displayed on the touch screen display based on a last contact position of the swipe gesture. The logic device may render the sonar data according to the adjusted field of view.

In various embodiments, the side-looking sonar system is configured to be coupled to a mobile structure such as a watercraft, aircraft, and/or a motor vehicle. The side-looking sonar system may include a user interface and logic device which may be integrated as a portable user interface such a device configured to communicate with the side-looking sonar system over a wireless communication link.

An embodiment of a method includes detecting a horizontal swipe gesture performed on a touch screen display of a user interface, wherein the user interface is configured to receive and/or display side-looking sonar data provided by a side-looking sonar system. The method further includes stretching a field of view of the displayed side-looking sonar data in accordance with the horizontal swipe gesture, and snapping the displayed side-looking sonar data to a field of view in accordance with the horizontal swipe gesture.

In various embodiments, the displayed side-looking sonar data field of view is one of a left-only view, a right-only view and a center view. It will be appreciated that other combinations of views may be configured in alternate embodiments. The step of snapping the displayed side-looking sonar data may include, if the horizontal swipe gesture is a right swipe, snapping to a center view if a current field-of-view is a left-only view, and if the current field-of-view is not a left-only view, snapping to a right-only view. If the horizontal swipe gesture is a left swipe, then the displayed side-scan sonar may be snapped to a center view if a current field-of-view is a right-only view, and if the current field-of-view is not a right-only view, snapped to a left-only view.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5A-D illustrate a diagram of a user interface of side-looking sonar system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sonar adjustment systems utilizing a touch screen display may be provided by a user interface, a logic device, and a sonar system, and may include one or more sonar transducer assemblies, orientation sensors, gyroscopes, accelerometers, position sensors, and/or speed sensors providing measurements of an orientation, a position, an acceleration, and/or a speed of the sonar transducer assemblies and/or a coupled mobile structure. For example, the sensors may be mounted to or within the mobile structure (e.g., a watercraft, aircraft, motor vehicle, and/or other mobile structure), or may be integrated with the user interface and/or the sonar transducer assemblies. Embodiments of the present disclosure produce side-looking sonar imagery that can be focused on features within the side-looking sonar imagery using intuitive gestures performed on a touch screen, thereby providing side-looking sonar imagery that is easier to manipulate and interpret than side-looking sonar data provided by conventional systems and/or methods.

Figure 1A:
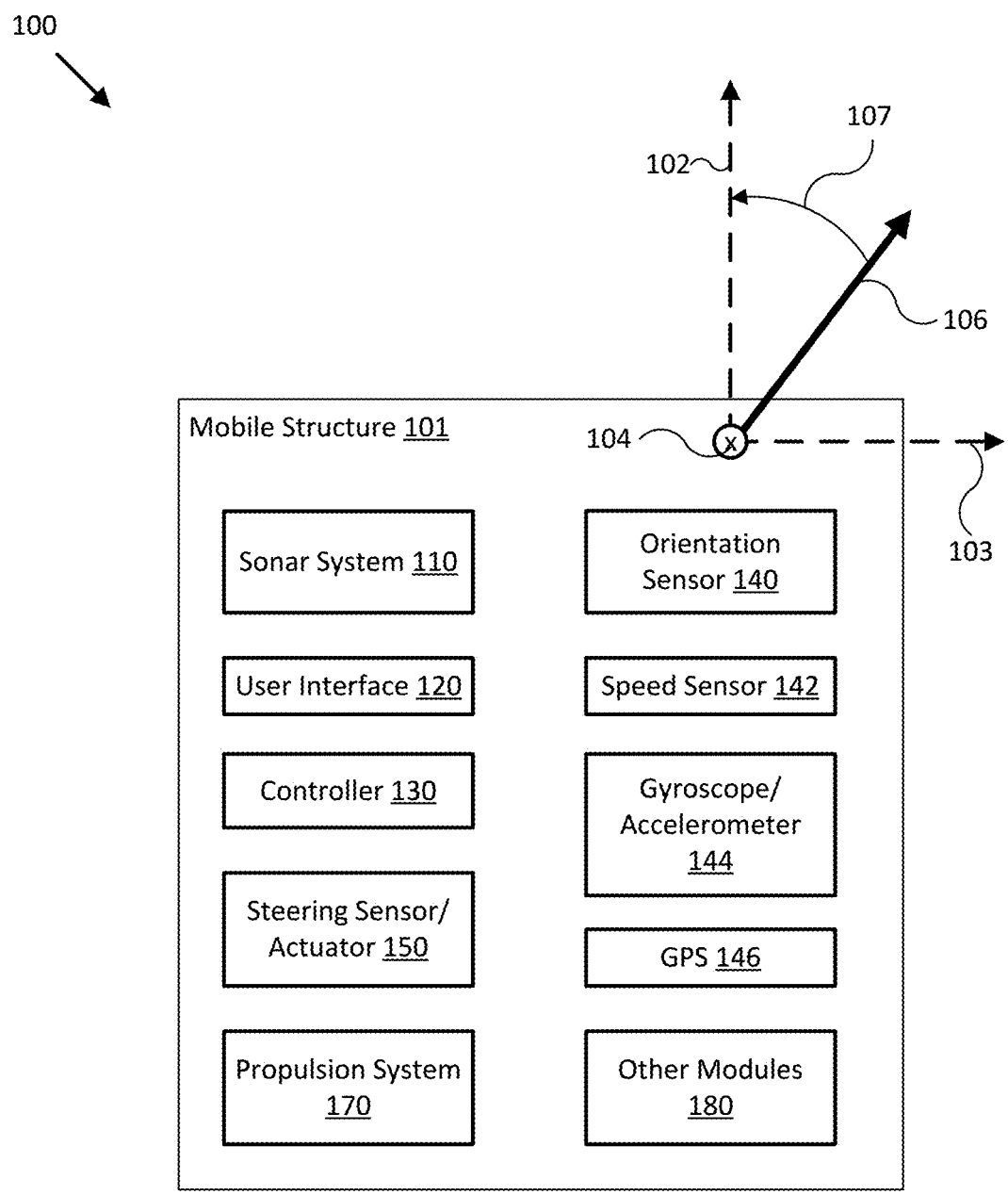
FIG. 1A illustrates a block diagram of a sonar system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope and accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In further embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein.

Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and cost, for example, and may be implemented with a single connection to other devices of system 100 (e.g., via an Ethernet cable with power over Ethernet, an integral power cable, and/or other communication and/or power transmission conduits integrated into a single interface cable), such as to user interface 120.

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/ port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
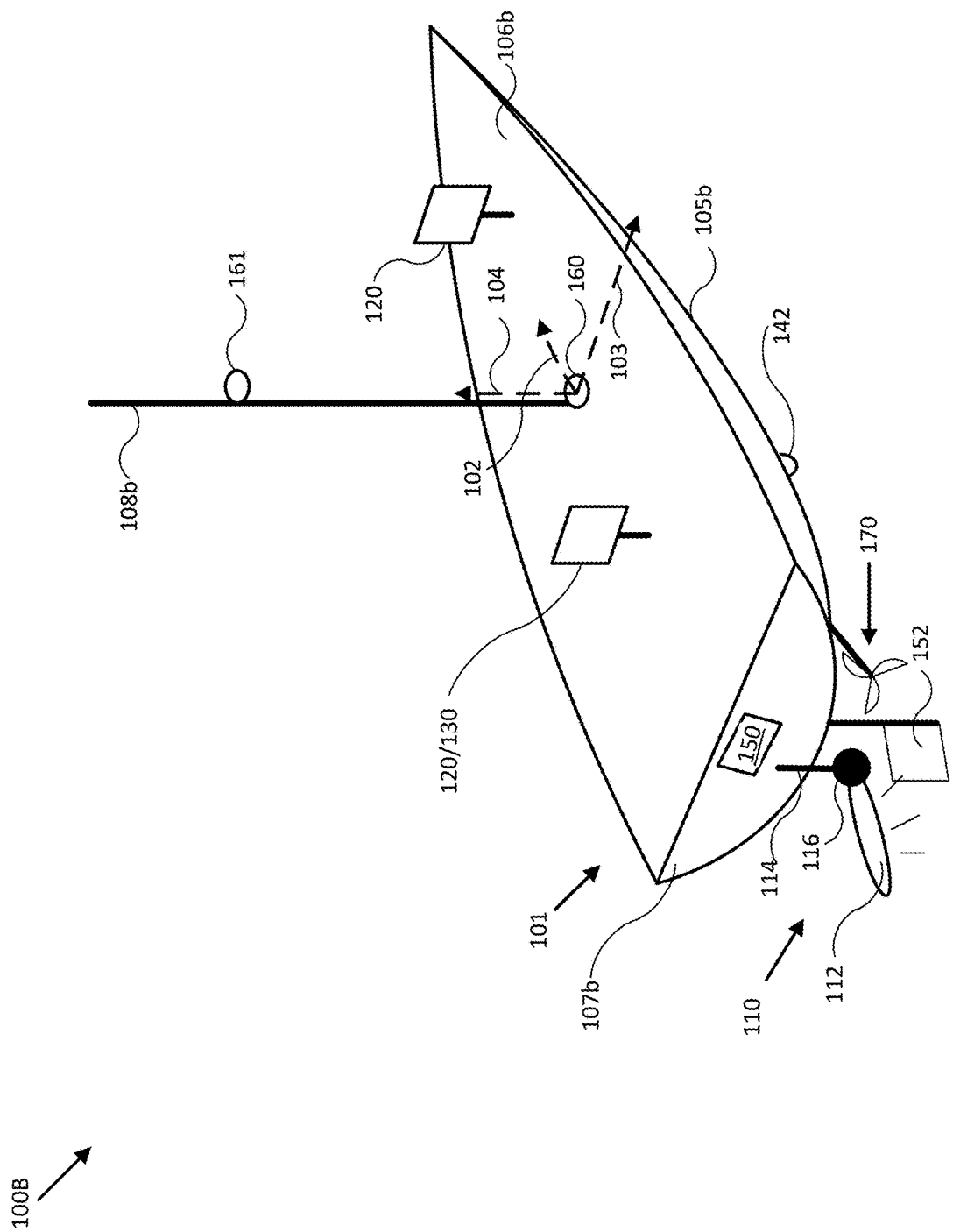
FIG. 1B illustrates a diagram of a sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1A. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In various embodiments, transducer assembly 112 may include a side-looking sonar transducer, or an array of two or more side-looking sonar transducers. The side-looking transducer assembly 112 may be coupled to the transom bracket/electrical conduit 114 in a substantially fixed position relative to the transom 107b. In another embodiment, the transom bracket/electrical conduit 114 further includes a tow cable for towing the side-looking transducer assembly 112 behind the mobile structure 101. The transducer assembly 112 may include other components and transducers, including a down-looking sonar transducer. In one embodiment, for example, a down-looking transducer broadcasts a conical beam (e.g., 20-60 degrees) to produce a sonar image of the view down from the mobile structure 101, and a side-looking sonar transducer array provides additional views on either side of the mobile structure 101 (e.g., 600 feet horizontally on each side of the mobile structure 101).

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
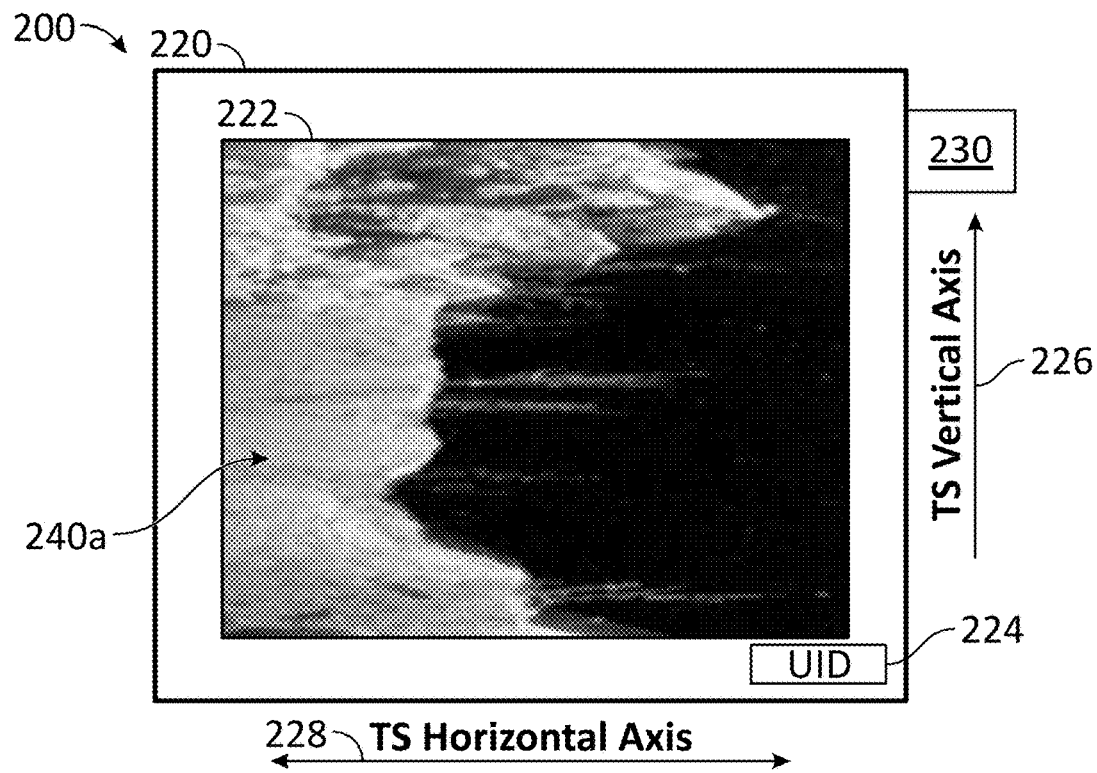
FIGS. 2A-C illustrate diagrams of a display and interface in a side-looking sonar system in accordance with an embodiment of the disclosure.
Figure 2B:
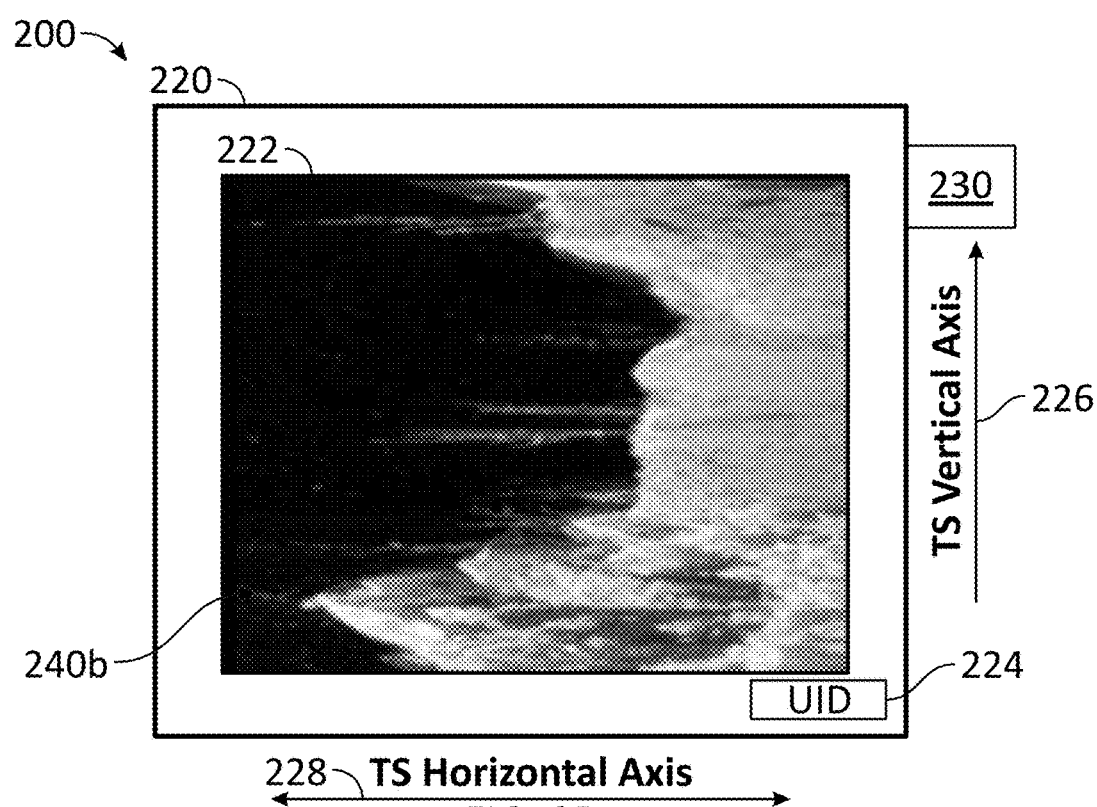
Figure 2C:
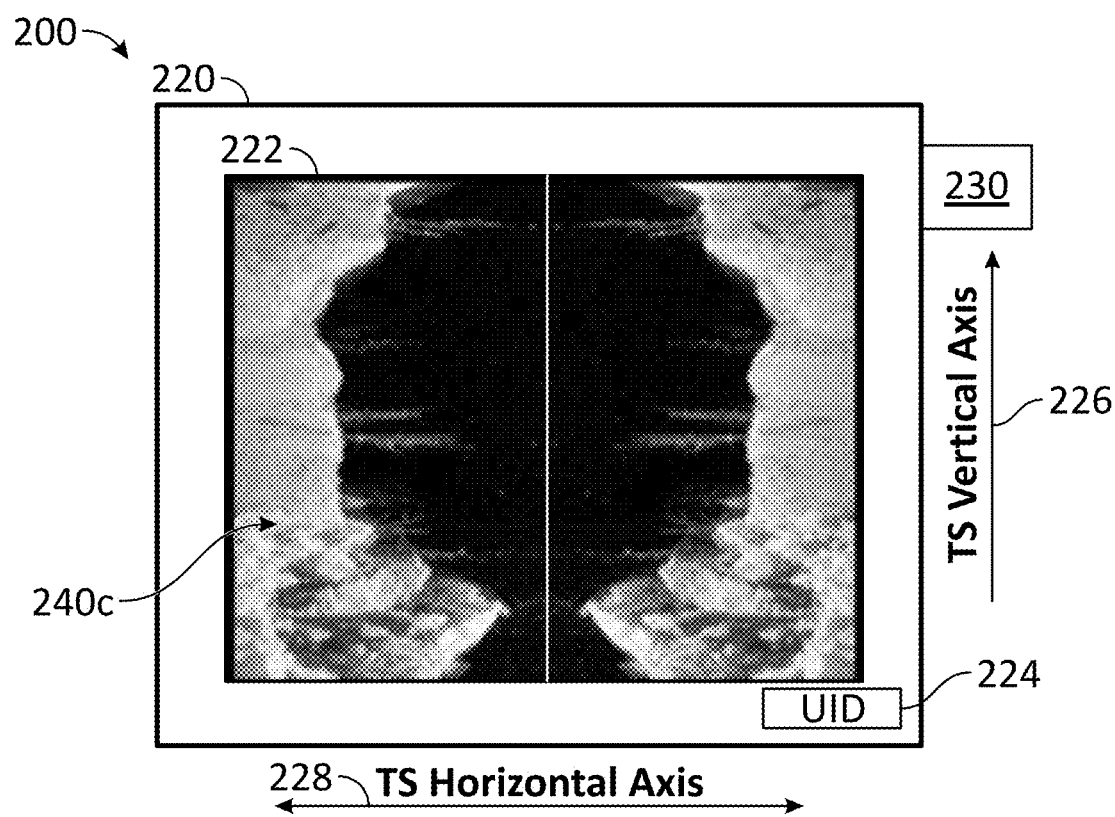

FIGS. 2A-C illustrate a sonar adjustment system 200 including user interface 220 in accordance with an embodiment of the disclosure. In various embodiments, user interface 220 may be implemented with similar functionality as that described with reference to user interface 120 and/or controller 130 in FIGS. 1A and 1B. In the embodiment shown in FIGS. 2A-C, user interface 220 may be configured to display side-looking sonar data 240*a-c* (using sonar system 110 of FIGS. 1A and 1B) to a user operating a touch screen display. For example, user interface 220 may be configured to display rendered sonar imagery 240 in touch screen display 222. In addition, user interface 220 may be configured to provide for adjustment of sonar system 110, as described herein.

In the illustrated embodiment, side-scan sonar data 240 is rendered on touch screen display with the vertical axis 226 of sonar data 240 representing the direction of motion of the sonar system 110 and the horizontal axis 228 representing a field of view image perpendicular to the direction of travel. Each horizontal row of data in sonar data 240 corresponds to one or more ensonifications or pings (e.g., stimuli) of sonar system 110, and the individual elements of sonar data arranged on touch screen display 222 correspond to samples of sonar returns. In the provided embodiment, the touch screen display may display a left view (FIG. 2A) representing sonar images of the left side of sonar system 110, a right view (FIG. 2B) representing sonar images of the right side of sonar system 110, and a center view (FIG. 2C) representing a view substantially centered under the sonar system 110. Each image represents data in substantially the direction of TS Vertical Axis 226, with a left/right/center field of view represented by TS Horizontal Axis 228.

In various embodiments, the scroll rate of touch screen display 222 may be different than the stimulus rate of sonar data 240 and/or sonar system 110. If the scroll rate of touch screen display 222 is higher than the stimulus rate of sonar data 240, sonar data from a single ping may be used to populate multiple pixel rows until new sonar data is provided to user interface 220. If the scroll rate of touch screen display 222 is lower than the stimulus rate of sonar data 240, sonar data from single pings may be omitted or dropped, or sonar data from multiple pings blended together (e.g., along rate axis 242) to populate the available pixels of touch screen 222. In addition, touch screen display 222 may be characterized with a refresh rate that may be different from the scroll rate and/or the stimulus rate. User interface 220 may be configured to adjust the refresh rate of touch screen 222 to accommodate a selected scroll rate and/or stimulus rate and/or to reduce power usage of touch screen display 222.

In various embodiments, TS vertical axis 226 and TS horizontal axis 228 characterize an orientation of touch screen display 222.

In various embodiments, the touch screen display described herein provides an improved method for selecting the view presented to the user of a side-scan sonar system using touch-swipe gestures. In one embodiment, the user swipes left or right on the touch screen display to snap the view into one of three possible positions. The illustrated method provides advantages over clumsy side-looking sonar system interfaces, which include user access to menus or dedicated screen space for displaying controls such as screen drop down menus or on-screen buttons.

In the illustrated embodiment, the side-viewing sonar system provides an interface allowing the user to select between the three view options illustrated in FIGS. 2A-C: left-only, right-only or centered. In operation, a user (such as a fisherman on a boat) may be searching for objects such as a school of fish. A quick, intuitive display offering a direct method for selecting the view on touch screen products is desired. In one embodiment, the user swipes the screen left or right, perpendicular to the direction of sonar scrolling (TS Vertical Axis 226) to select the chosen view. As the user swipes the sonar display will "stretch" in the chosen direction until a certain threshold is reached, at which point the new view will then "snap" into position.

Figure 3:
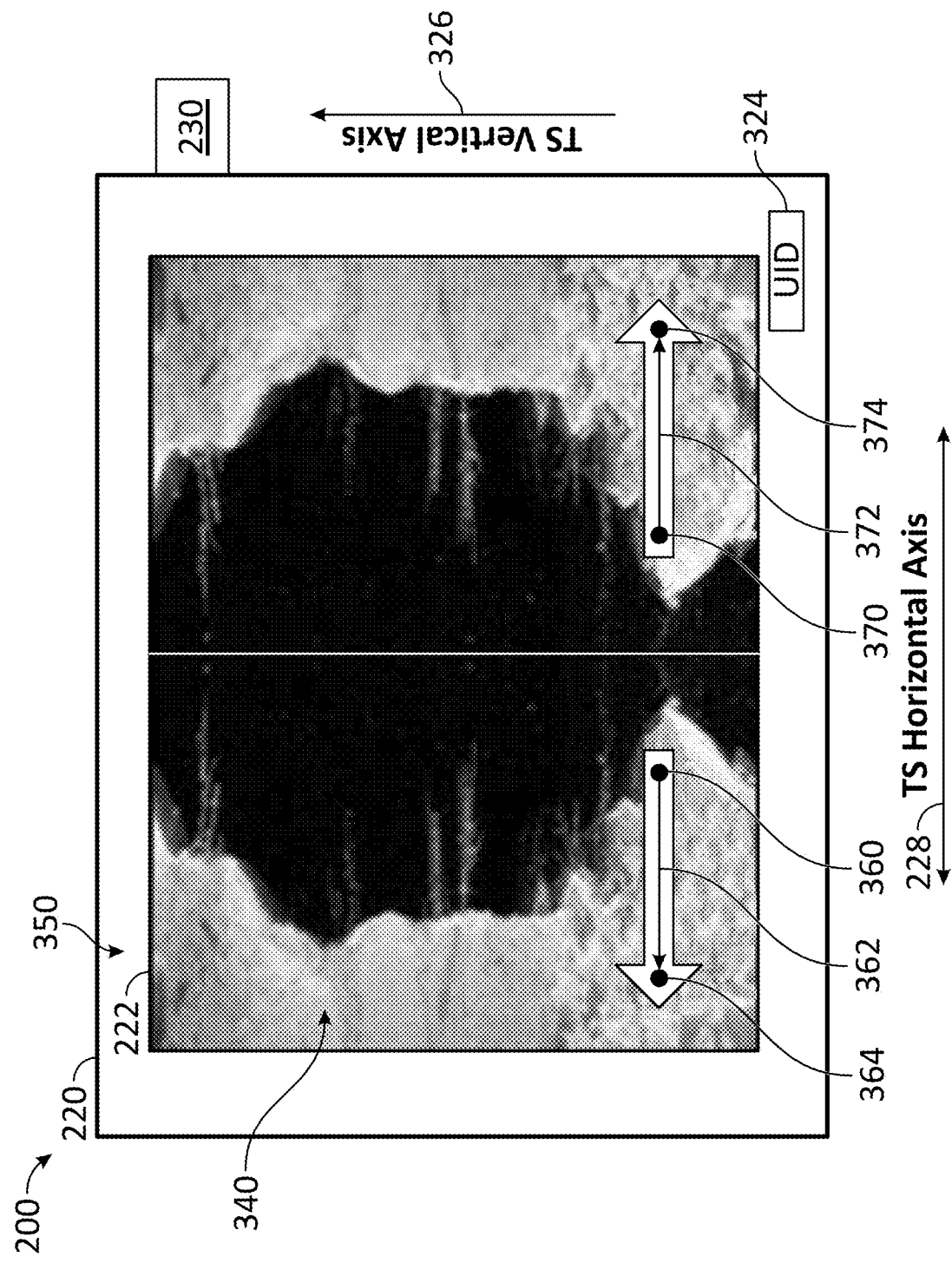
FIG. 3 illustrates a diagram of a side-looking sonar system in accordance with an embodiment of the disclosure.

Referring to FIG. 3, each swipe gesture includes a contact point and a direction of travel. In one embodiment, a user applies a contact to touch screen display 222 and slides the contact across the screen substantially in the direction of the TS Horizontal Axis 228 to access available left/right sidescan image views. For example, a left swipe includes an initial contact point 360, which is then slid across the surface of the touch screen display 222 in a direction of travel 362 towards the left side of the touch screen display and substantially parallel to the TS Horizontal Axis 228. A right swipe includes an initial contact point 370, which is then slid across the surface of the touch screen display 222 in a direction of travel 372 towards the right side of the touch screen display and substantially parallel with the TS Horizontal Axis 228.

In various embodiments, user interface 220 is configured to estimate a direction of travel and a swipe length corresponding to contact points of the swipe gesture, and use the direction of travel and swipe length to determine whether a swipe occurred and whether a threshold swipe length has been exceeded. For example, in one embodiment, user interface 220 may be configured to determine a start position and a stop position of a swipe gesture illustrated by a starting contact point 360 and a release point 364, respectively, of a left swipe, and a starting contact point 370 and a release point 374 of a right swipe. User interface 220 may then determine the relative screen positions of the start and stop positions on the touch screen display 222 and use the two screen positions to calculate the swipe direction and swipe length. User interface 220 may be configured to determine the swipe length by calculating a distance between the touchscreen coordinates of the start and stop positions (e.g., as indicated by arrows 262 and 272).

In various embodiments, "stop" positions as described herein may refer to lift-off positions corresponding to removal of a contact from a detection range of touch screen display 222, may refer to positions where motion of a contact has stopped or paused for a predetermined period of time, and/or may refer to current position of a contact as sensed by touch screen 222 (e.g., relative to a sense and/or refresh rate of touch screen display 222, for example). As such, the methods of adjustment described herein may appear substantially continuous with a corresponding swipe gesture as viewed by a user of user interface 220.

In various embodiments, a left or right swipe gesture is a swipe that is substantially parallel to the TS Horizontal Axis 228, which may be determined, for example, by estimating an angle of travel with respect to TS Horizontal Axis 228 or estimating the vertical offset during the gesture. User interface 220 may be configured to use the estimated values to determine whether a swipe command was received, for example, by comparing the estimate angle or vertical offset to predetermined threshold values.

In various embodiments, user interface 220 may be configured to drag and stretch a current screen image as part of the swipe interface. For example, the contact point represents a particular vertical column of display data on the display image, which may be dragged left or right across the screen as the user swipes, allowing the user to see side-scan sonar imagery that is otherwise off screen. As the image is dragged left or right, user interface 220 may be configured to render sonar data 240 on touch screen display 222 representing the new image view according to the sonar data. The user may select the new view by releasing the contact past a predetermined threshold distance, or snap back to the current view by releasing the contact within the predetermined threshold distance.

In various embodiments, the displayed sonar image is shown as scrolling horizontally between the various views by including at least one intermediate view between the left, center and right views. Further, because the vertical axis 326 of sonar data 340 represents the direction of motion of the sonar system 110, the sonar image may scroll vertically during the swipe gestures described herein.

By facilitating the swipe gesture as described herein, embodiments of the present disclosure provide a flexible and intuitive adjustment methodology that can be used in real time to provide flexible views of side-scan sonar data.

Although sonar data 340 is shown in FIG. 3 as substantially encompassing the touch screen display 222, in other embodiments, the touch screen display may comprises multiple portions providing different views or information to the user. In various embodiments, user interface 220 may include one or more controllers, memory, other sensors, touch screen display 222, communication modules, and/or other modules 324 facilitating operation of user interface 220, which may or may not all be disposed within a common housing (e.g., to form a multifunction display). In some embodiments, one or more of such modules may be integrated with a stationary user interface and/or mount (e.g., coupled to deck 106b or mast/sensor mount 108b of mobile structure 101 in FIG. 1B) and be configured to communicate with devices within the housing of user interface 220 through one or more communication modules. User interface 220 may include input/output port 230, for example, which may be used to couple to other elements of system 100 of FIG. 1A or system 100B of FIG. 1B. In one embodiment, user interface 220 may be implemented as a multifunction display with power and/or transmitter circuitry allowing user interface 220 to power and/or provide sonar transmission signals to sonar system 110 over port 230.

Touch screen display 222 may be implemented as one or more LCDs, OLEDs, projection devices, and/or other digital displays that may be configured to display sonar data (e.g., from sonar system 110 of FIGS. 1A and 1B) and detect touches (e.g., start, travel, path, stop, and/or other touch characteristics of two or more points of contact) on touch screen display 222. In some embodiments, touch screen display may be configured to detect multiple points of contact for a single finger or stylus, for example. In such embodiments, user interface 220 may be configured to differentiate groups of contact points corresponding to separate fingers and/or stylus based on trajectory and/or locality, for example, and use such differentiated groups to provide a higher accuracy estimate of the reference angle and/or travel distance of a pinch gesture, as described herein.

Other modules 324 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of user interface 220. In some embodiments, other modules 324 may include various environmental sensors providing measurements and/or other sensor signals that can be displayed to a user and/or used by other devices of user interface 220 to facilitate operation of user interface 220. In some embodiments, other modules 324 may include one or more buttons and/or other user input devices configured to accept manual user input separate from touch screen display 222.

In various embodiments, user interface 220 may be implemented in a single housing with a single display (e.g., touch screen display 222) adapted to be held by a user while the user views the display. In other embodiments, the housing may be mounted to a mobile structure using a fixed or actuated mount to provide a fixed or actuated view relative to an orientation of the mobile structure.

In various embodiments, user interface 220 may be implemented as a portable electronic device, such as a tablet or smart phone, for example, that is configured to receive and/or display sonar data 340 from sonar system 110 over a wireless communication link. In some embodiments, user interface 220 may be configured to adjust the vertical and horizontal axes of touch screen 222 based on a detected orientation of user interface 220.

Figure 4:
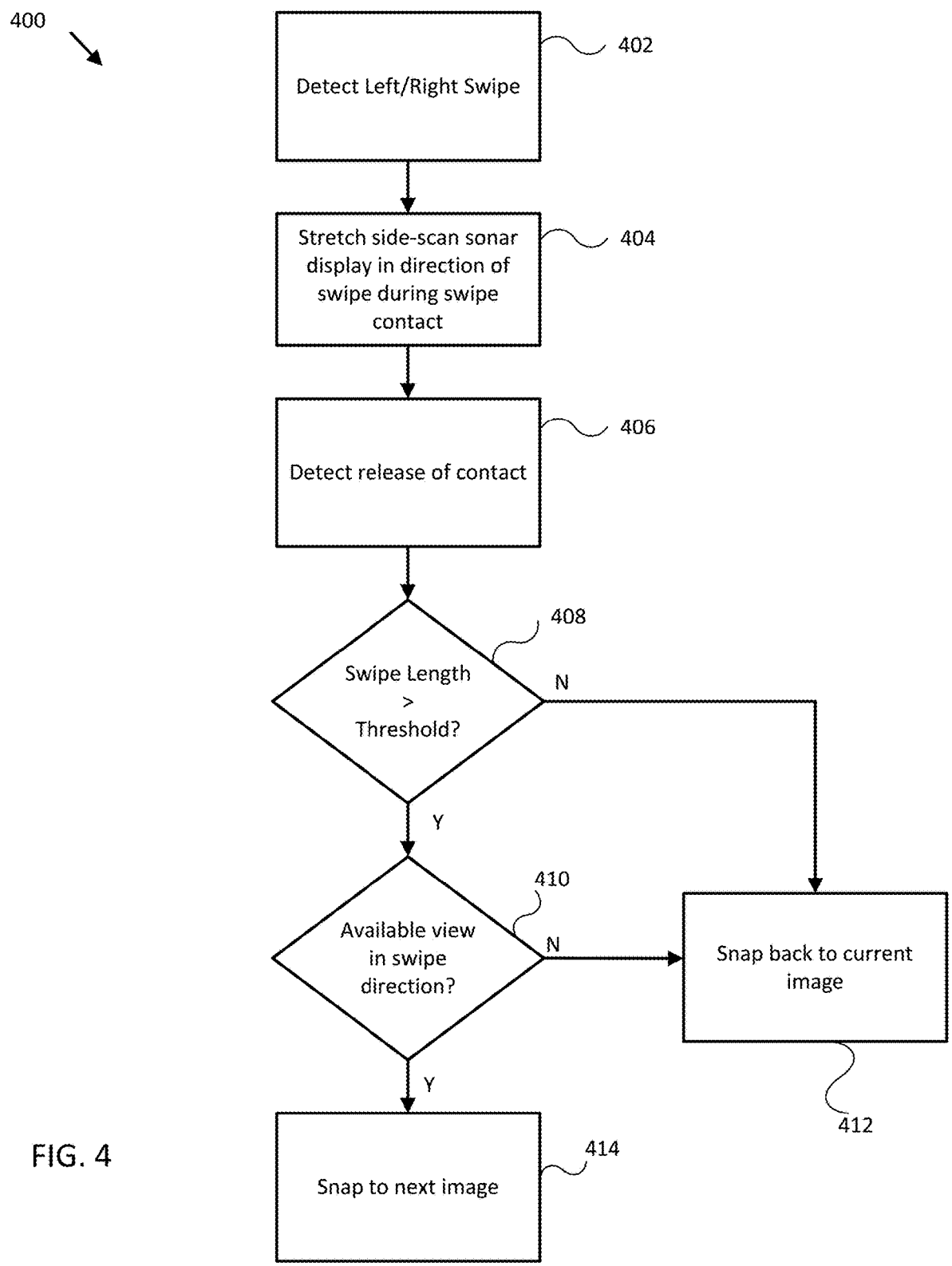
FIG. 4 illustrates a flow diagram of various operations to operate a side-looking sonar system in accordance with an embodiment of the disclosure.

FIG. 4 illustrates a flow diagram of process 400 to provide sonar adjustment for mobile structure 101 in accordance with embodiments of the disclosure. In some embodiments, the operations of FIG. 4 may be implemented as software instructions executed by one or more logic devices associated with corresponding electronic devices, sensors, and/or structures depicted in FIGS. 1A through 3. More generally, the operations of FIG. 4 may be implemented with any combination of software instructions and/or electronic hardware (e.g., inductors, capacitors, amplifiers, actuators, or other analog and/or digital components).

It should be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems described in reference to FIGS. 1A, 1B, 2 and 3, process 400 may be performed by other systems different from those systems and including a different selection of electronic devices, sensors, assemblies, mobile structures, and/or mobile structure attributes.

Process 400 represents a method for providing sonar adjustment using systems 100, 100B, 200, and/or 300 in accordance with embodiments of the disclosure. At the initiation of process 400, various system parameters may be populated by prior execution of a process similar to process 400, for example, or may be initialized to zero and/or one or more values corresponding to typical, stored, and/or learned values derived from past operation of process 400, as described herein.

In block 402, a logic device detects whether a left or right swipe gesture has been performed on a touch screen display. For example, user interface/controller 120/130 of system 100B, user interface 220 of system 200, and/or user interface 320 of system 300 may be configured to detect user or stylus contact with the touch screen and motion of the contact point in a left or right swiping trajectory across the touch screen display (e.g., touch screen display 222) and substantially parallel to the TS Horizontal Axis 228.

In some embodiments, user interface 220 and/or 320 may be configured to detect the swipe gesture, estimating an angle and a travel distance corresponding to the contact associated with the swipe gesture, and determine whether the swipe was a left or right swipe from the estimated angle and travel distance. In other embodiments, user interface 220 and/or 320 may be configured to estimate the travel distance by determining start and stop positions of the detected contact and determining the travel distance by subtracting the start touch screen coordinates from the stop touch screen coordinates. In one embodiment, the swipe direction can be determined by calculating an angle of travel and comparing the angle of travel a maximum angle threshold. In an alternate embodiment, the swipe direction can be determined by comparing a vertical offset to a maximum offset threshold. In various embodiments, the angle of travel and/or vertical offset threshold are calculated and compared to the maximum angle and offset, respectively, during the gesture. In such embodiments, the contact may be determined to not be a swipe if the thresholds are exceeded during the contact gesture.

In block 404, a logic device stretches the side-scan sonar display in the direction of the detected swipe during swipe contact. For example, user interface/controller 120/130 of system 100B, user interface 220 of system 200, and/or user interface 320 of system 300 may be configured to scroll the image view in the direction and at the rate of the swipe (for example, a grab and drag gesture). In one embodiment, user interface 220 of system 200 and/or user interface 320 of system 300 may be configured to adjust the scroll rate of the image by determining the rate of the swipe gesture on the touch screen display. In various embodiments, the grab and drag gesture may display the new image view in real time during the swipe, or display intermediate images to show smooth scrolling.

In block 406, the end of the swipe is detected based on the release of contact (e.g., finger or stylus) from the touch screen. Next, in step 408, the swipe length is calculated and compared against a threshold value. In one embodiment, the swipe length may be calculated by subtracting the touch screen coordinates of the starting contact point from the touch screen coordinates of the ending contact point. If the swipe distance is greater than the threshold, then the image snaps to a next available view in the direction of the swipe. Otherwise, the image snaps back to the current view (block 412). In one embodiment, the user may drag the image to the right or left to see further side view data on either side of the current view, respectively, and select the current view or side view based on the length of the swipe at release. For example, the threshold may be set at a length above which the image scrolls in the direction of the swipe (such as a full swipe across the touch screen) and below which the image snaps back to a current view (such as a short swipe).

In block 410, a logic device determines if there is an available view in the swipe direction. For example, as illustrated in FIGS. 2-3, one embodiment includes 3 views: left-only, right-only and center. If the screen is in the center view, then a swipe to the right will provide a left-only view, and a swipe to the left will provide a right-only view. If the screen is in a left-only view, then a swipe to the right will snap back to the current image (block 412) because there are no more views to the left. A swipe to the left would bring the view back to center. If the screen is on a right-only view, then a swipe to the left will snap back to the current image (block 412) because there are no more views to the right. A swipe to the right would bring the view back to center.

In block 414, a logic device renders sonar data according to the newly selected view. For example, user interface/controller 120/130 of system 100B, user interface 220 of system 200, and/or user interface 320 of system 300 may be configured to render sonar data 240 according to the adjusted field of view. In one embodiment, user interface 220 of system 200 and/or user interface 320 of system 300 may be configured to render the sonar data according to the configuration information such as a refresh or scan rate and/or a scale factor for scaling the sonar data according. In some embodiments, user interface 220 of system 200 and/or user interface 320 of system 300 may be configured to render sonar data 240 according to a refresh or scan rate and/or sample scale factor by rendering sonar data 240 on touch screen display 222 or 322 at a rate (e.g., a refresh rate) equal to or greater than configuration parameters.

By facilitating adjustment of side-scan sonar data through a single gesture, embodiments of the present disclosure provide a flexible and intuitive methodology that can be used to adjust operation of user interface 222, sonar system 110, and/or other elements of system 100 with relatively little user interaction. Minimizing user interaction can be particularly helpful to reduce stress and/or distraction of a user of a mobile structure during critical maneuvers managed through use of a remote sensing system, such as sonar system 110.

It is contemplated that any one or combination of methods to provide sonar adjustment may be performed according to one or more operating contexts of a control loop, for example, such as a startup, learning, running, and/or other type operating context. For example, process 400 may proceed back to block 402 and proceed through process 400 again to produce sonar and display adjustment, as in a control loop.

Referring to FIGS. 5A-D, an embodiment of an operation of a swipe feature will now be described. In the figures, swipe gestures are indicated by a user's hand which touches the screen at a starting point of the swipe and swipes in a direction of an arrow to indicate interaction of a user with touch screen display 222. The user's hand and arrow typically are not rendered as images on the touch screen display 222. Each swipe gesture indicator corresponds to a user applying one contact (e.g., finger and/or stylus) to touch screen display 222 and moving the contact in a substantially horizontal direction (either left or right relative to the display 222) while the contact is detected by touch screen display 222.

In FIG. 5A, the display starts in a center view. The user swipes left on the screen, stretching the screen to the left and providing the user with a view of the offscreen image. If the user releases the swipe at a point past a threshold distance from the starting point of the swipe, then the right view will snap into place. If the release point is at a distance that is not greater than or equal to the threshold, then the image snaps back to the center position.

In FIG. 5B, the display starts in a center view. The user swipes right on the screen, stretching the screen to the right and providing the user with a view of the offscreen image to the left. If the user releases the swipe at a point past a threshold distance from the starting point of the swipe, then the left view will snap into place. If the release point is at a distance that is not greater than or equal to the threshold, then the image snaps back to the center position.

In FIG. 5C, the display starts on a right-only view. The user swipes left on the screen, stretching the screen to the left and providing the user with a view of the offscreen image to the right. If the user releases the swipe at a point past a threshold distance from the starting point of the swipe, then the center view will snap into place. If the release point is at a distance that is not greater than or equal to the threshold, then the image snaps back to the right view.

In FIG. 5D, the display starts on a left-only view. The user swipes left on the screen, stretching the screen to the right and providing the user with a view of the offscreen image to the left. If the user releases the swipe at a point past a threshold distance from the starting point of the swipe, then the center view will snap into place. If the release point is at a distance that is not greater than or equal to the threshold, then the image snaps back to the left view.

Embodiments of the present disclosure can thus provide sonar visualization adjustment using a touch screen display. Such embodiments may be used to provide sonar imagery to assist in navigation for a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a user interface comprising a touch screen display and configured to receive and/or display side-scan sonar data provided by a side-scan sonar system; and
   a logic device configured to communicate with the user interface and/or the side-scan sonar system, wherein the logic device is configured to:
      detect a horizontal swipe gesture performed on the touch screen display;
      adjust the touch screen display based on a swipe distance to adjust a field of view in the direction of the horizontal swipe gesture; and
      snap the touch screen display to a view according to the length of the horizontal swipe gesture,
   wherein the side-scan sonar data is rendered on the touch screen display with a vertical axis representing a direction of motion of the side-scan sonar system and a horizontal axis representing a field of view image perpendicular to the direction of motion,
   wherein the touch screen display scrolls vertically to display the side-scan sonar data at a scroll rate, and
   wherein adjusting the touch screen display comprises stretching at least a portion of the field of view along the horizontal axis.

2. The system of claim 1, wherein detecting the horizontal swipe gesture comprises:
   detecting a point of contact on the touch screen display;
   tracking the point of contact across the touch screen display; and
   estimating an angle of travel and a travel distance corresponding to a starting contact point and an ending contact point.

3. The system of claim 2, wherein detecting the horizontal swipe gesture further comprises:
   determining a horizontal swipe by comparing the angle of travel to a threshold angle and a travel distance to a threshold distance.

4. The system of claim 2, wherein estimating the travel distance comprises:
   determining start and stop positions of the detected swipe gesture for the point of contact; and
   determining the travel distance by subtracting a first touch screen coordinate of the start position from a second touch screen coordinate of the stop position.

5. The system of claim 1, wherein adjusting the touch screen display comprises:
   tracking a contact position during the horizontal swipe gesture; and
   selecting a view of the side-scan sonar data to be displayed on the touch screen display based on a current contact position.

6. The system of claim 5, wherein the contact position adjusts the displayed field of view in accordance with a detected horizontal movement.

7. The system of claim 1, wherein the side-scan sonar system is configured to be coupled to a mobile structure comprising a watercraft, aircraft, and/or a motor vehicle.

8. The system of claim 1, wherein:
   the user interface and the logic device are integrated together to form a multifunction display; and
   the multifunction display is configured to provide power and/or sonar transmission signals to a sonar transducer assembly of the side-scan sonar system.

9. The system of claim 1, wherein:
   the user interface and the logic device are integrated together to form a portable user interface; and
   the portable user interface is configured to communicate with the side-scan sonar system over a wireless communication link.

10. The system of claim 1, further comprising the side-scan sonar system, wherein the side-scan sonar system comprises a side-looking sonar transducer; and
wherein the side-scan sonar data is generated by the side-looking sonar transducer.

11. The system of claim 10, wherein the side-scan sonar data comprises a plurality of rows, each row corresponding to at least one ensonification of the side-looking sonar transducer.

12. The system of claim 1, wherein snapping the touch screen display comprises snapping the touch screen display to one of a first view representing sonar images of a first side of the side-scan sonar system, a second view representing sonar images of a second side of the side-scan sonar system, and a third view representing a view centered under the side-scan sonar system.

13. The system of claim 1, wherein the logic device is configured to:
upon detection of a left swipe gesture, snap to a center view if a current view is a left-only view or snap to a right-only view if the current view is not a left-only view; and
upon detection of a right swipe gesture, snap to a center view if the current view is a right-only view or snap to a left-only view if the current view is not a right-only view.

14. The method of claim 13, wherein:
the left-only view corresponds to a left side of the side-scan sonar system, the right-only view corresponds to a right side of the side-scan sonar system, and the center view corresponds to both the left and right sides of the side-scan sonar system.

15. A method comprising:
detecting a horizontal swipe gesture performed on a touch screen display of a user interface, wherein the user interface is configured to receive and/or display side-scan sonar data provided by a side-scan sonar system, wherein detecting the horizontal swipe gesture comprises detecting one of a left or right swipe;
adjusting a field of view of the displayed side-scan sonar data in accordance with the horizontal swipe gesture; and
snapping the displayed side-scan sonar data to a view in accordance with the horizontal swipe gesture, wherein snapping the displayed side-scan sonar data comprises:
if the horizontal swipe gesture comprises a left swipe, then snapping to a center view if a current view is a left-only view, and if the current view is not a left-only view, snapping to a right-only view, and
if the horizontal swipe gesture comprises a right swipe, then snapping to a center view if the current view is a right-only view, and if the current view is not a right-only view, snapping to a left-only view.

16. The method of claim 15, wherein the displayed side-scan sonar data view is one of a left-only view, right-only view, and center view.

17. The method of claim 16, wherein snapping the displayed side-scan sonar data further comprises:
calculating a length of the horizontal swipe gesture;
comparing the length to a threshold value;
snapping to the current view if the calculated length is less than the threshold value; and
snapping to a new view if the calculated length is greater than the threshold value.

18. The method of claim 15, wherein snapping the displayed side-scan sonar data further comprises:
determining whether a new view is available in a swipe direction of the horizontal swipe gesture;
snapping to the new view if available in the swipe direction; and
snapping to the current view if the new view is not available in the swipe direction.

19. The system of claim 15, wherein snapping the displayed side-scan sonar data comprises snapping the touch screen display to one of a first view representing sonar images of a first side of the side-scan sonar system, a second view representing sonar images of a second side of the side-scan sonar system, and a third view representing a view centered under the side-scan sonar system.

20. A method comprising:
detecting a horizontal swipe gesture performed on a touch screen display of a user interface, wherein the user interface is configured to receive and/or display side-scan sonar data provided by a side-scan sonar system;
adjusting a field of view of the displayed side-scan sonar data in accordance with the horizontal swipe gesture; and
snapping the displayed side-scan sonar data to a view in accordance with the horizontal swipe gesture, wherein the displayed side-scan sonar data view is one or a left-only view, a right-only view, or a center view, wherein snapping the displayed side-scan sonar data comprises:
calculating a length of the horizontal swipe gesture;
comparing the length to a threshold value;
snapping to a current view if the calculated length is less than the threshold value; and
snapping to a new view if the calculated length is greater than the threshold value.

* * * * *